(12) United States Patent
Duyanovich et al.

(10) Patent No.: US 7,673,189 B2
(45) Date of Patent: Mar. 2, 2010

(54) TECHNIQUE FOR MAPPING GOAL VIOLATIONS TO ANAMOLIES WITHIN A SYSTEM

(75) Inventors: Linda M. Duyanovich, Saratoga, CA (US); Juan C. Gomez, San Jose, CA (US); Kristal T. Pollack, San Jose, CA (US); Sandeep M. Uttamchandani, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 11/347,999

(22) Filed: Feb. 6, 2006

(65) Prior Publication Data

US 2007/0220371 A1 Sep. 20, 2007

(51) Int. Cl.
*G06F 11/00* (2006.01)
(52) U.S. Cl. .................................................... 714/47
(58) Field of Classification Search ............. 714/47
See application file for complete search history.

(56) References Cited

U.S. PATENT DOCUMENTS

| | | | |
|---|---|---|---|
| 5,446,874 A * | 8/1995 | Waclawsky et al. ............ 714/1 |
| 5,465,321 A * | 11/1995 | Smyth ......................... 706/20 |
| 5,682,523 A | 10/1997 | Chen et al. |
| 5,815,650 A | 9/1998 | Apperley et al. |
| 5,963,943 A * | 10/1999 | Cummins et al. ............. 707/10 |
| 6,263,454 B1 | 7/2001 | Gold et al. |
| 6,457,067 B1 | 9/2002 | Byers et al. |
| 6,671,659 B2 | 12/2003 | Troia et al. |
| 2001/0052090 A1 | 12/2001 | Mio |
| 2004/0054695 A1 | 3/2004 | Hind et al. |
| 2004/0054984 A1 | 3/2004 | Chong et al. |
| 2004/0153844 A1 | 8/2004 | Ghose et al. |
| 2006/0048006 A1 * | 3/2006 | Lou ............................ 714/25 |
| 2006/0085668 A1 * | 4/2006 | Garrett ......................... 714/4 |
| 2007/0136262 A1 * | 6/2007 | Dettinger et al. .............. 707/4 |
| 2007/0208983 A1 * | 9/2007 | Sudhakar et al. ............ 714/732 |

* cited by examiner

*Primary Examiner*—Scott T Baderman
*Assistant Examiner*—Kamini Patel
(74) *Attorney, Agent, or Firm*—Gibb I.P. Law Firm, LLC

(57) ABSTRACT

A computer and method for problem detection and determination for automated system management in a system, wherein the method comprises monitoring system state, workload, and performance parameters of the system; comparing the monitored parameters against normal system performance behavior of the system, wherein the normal system performance behavior is maintained as a mapping of a system state and workload-to-performance parameters; summarizing performance abnormalities at a specified layer in the system as computation and data-processing attributes, wherein the performance abnormalities comprise deviations from the normal system performance behavior; correlating the performance abnormalities across multiple layers in the system using an attribute-based framework; and communicating a root-cause of the performance abnormalities.

21 Claims, 5 Drawing Sheets

TECHNIQUE FOR MAPPING GOAL VIOLATIONS TO ANAMOLIES WITHIN A SYSTEM

BACKGROUND

1. Field of the Invention

The embodiments of the invention generally relate to computer systems, and, more particularly, to problem detection and determination in a system.

2. Description of the Related Art

The objective of system management is to ensure that the behavior of the system converges towards certain user-defined goals. These goals are generally in terms of performance, availability, and security. In order to realize this objective, the management framework has two key components: (1) the Problem Determination (PD) component that is responsible for analyzing the system and shortlisting possible reasons for goal violations; (2) a Corrective Actions Engine (CAE) to determine the action(s) to be invoked in response to the goal violation. The term actions could refer to either changing the value of tunable parameters (e.g. prefetch-size, update interval, number of threads) or resource reallocation such as migration, replication, splitting.

An analogy to the management framework is that of a medical doctor; the doctor needs to first diagnose the disease (PD) and then select the "optimal" medicine(s) (CAE) among all the ones that he knows about. Among the two components of a management framework, the development of CAE has been an active area of research with existing approaches classified as either rule-based or model-based. System management is not limited to taking actions after the goals are violated, but also being proactive in interpreting abnormal system behavior and taking the necessary corrective actions before any violations occur.

Problem detection and determination is considered to be complex and domain-specific. That is, it is possible to collect a plethora of information about the system activity using generic, domain-independent techniques, but is highly non-trivial to make sense of the collection information and determine what led to the violation of goals. The conventional solutions provide an interface between the CAE and the PD that is event-based where the events signify the nature of the problem within the system. However, in real-world system management scenarios, problem determination is not a definitive prescription of how the system should be adapted, but rather a collection of "strategies" that the CAE can analyze for feasibility and optimization. An analogy is that of Preference Engineering in databases where the user expresses a desire to "find a hotel that is less than one mile from the beach and under 300 dollars in cost." Such a result may not really exist, but it expresses the intuition of what the user is looking for.

Conventional problem determination frameworks in computer storage systems generally can be divided into two parts: (1) Frameworks to collect information about the system activity, where depending on how information is acquired, these frameworks are classified as intrusive, semi-intrusive, and non-intrusive (also called black-box); and (2) Information models to analyze the gathered information, where the existing paradigms for specifying these models are generally based on rule, cook-book, data-mining, etc. The semantics of information models are domain-specific. Much of the existing research in the industry is based on web-services, java frameworks, etc. However, there generally does not exist a simplistic problem determination framework in the domain of computer storage systems. Accordingly, there remains a need for such a framework.

SUMMARY

In view of the foregoing, an embodiment of the invention provides a method for problem detection and determination for automated system management in a system, and a program storage device readable by computer, tangibly embodying a program of instructions executable by the computer to perform a method for problem detection and determination for automated system management in a system, wherein the method comprises monitoring system state, workload, and performance parameters of the system; comparing the monitored parameters against normal system performance behavior of the system, wherein the normal system performance behavior is maintained as a mapping of a system state and workload-to-performance parameters; summarizing performance abnormalities at a specified layer in the system as computation and data-processing attributes, wherein the performance abnormalities comprise deviations from the normal system performance behavior; correlating the performance abnormalities across multiple layers in the system using an attribute-based framework; and communicating a root-cause of the performance abnormalities.

Preferably, the monitoring of the system state, workload, and performance parameters comprises parsing the monitored data for values associated with computer processing unit (CPU) and input/output (I/O) work attributes, and wherein the system state, workload, and performance parameters are specific to a protocol of the specified layer in the system. Furthermore, the summarizing of performance abnormalities at a specified layer in the system as computation and data-processing attributes preferably comprises comparing computer processing unit (CPU) and input/output (I/O) work attributes with the mapping of the normal performance behavior of the system. The method may further comprise communicating the root-cause of the performance abnormalities in a query format by expressing a strategy of how an optimal performance behavior of the system can be adapted; providing a feasibility of implementing the strategy; and optimizing the strategy with respect to other performance strategies for running the system.

Additionally, the monitoring of system state, workload, and performance parameters comprises measuring parameters related to any of a switch, storage controller, and computer disks of the system. Moreover, the comparing of CPU and I/O work attributes with the history of the normal performance behavior of the system may comprise retrieving a current system state and workload in the mapping, and comparing a performance from the mapping with a current performance of the system to determine if the system comprises the performance abnormalities. The method may further comprise analyzing the CPU and I/O work attributes using any of searching the mapping for the load characteristics that are closest to a current load being applied to the system; and determining a change in the load characteristics of monitored data in comparison to a last n number of snapshots when performance goals of the system are being met.

Another embodiment provides a computer for problem detection and determination for automated system management in a system, wherein the computer comprises modules comprising system state, workload, and performance parameters of the system capable of being monitored; a first processor element adapted to compare the monitored parameters against normal system performance behavior of the system, wherein the normal system performance behavior is maintained as a mapping of a system state and workload-to-performance parameters; a second processor element adapted to summarize performance abnormalities at a specified layer in the system as computation and data-processing attributes, wherein the performance abnormalities comprise deviations from the normal system performance behavior; an attribute-based framework adapted to correlate the performance abnormalities across multiple layers in the system; and an output unit adapted to communicate a root-cause of the performance abnormalities.

The computer may further comprise a parser adapted to parse the monitored data for values associated with computer processing unit (CPU) and input/output (I/O) work attributes, and wherein the system state, workload, and performance parameters are specific to a protocol of the specified layer in the system. Additionally, the computer may further comprise a comparator adapted to compare computer processing unit (CPU) and input/output (I/O) work attributes with the mapping of the normal performance behavior of the system. Also, the computer may further comprise a query index adapted to communicate the root-cause of the performance by expressing a strategy of how an optimal performance behavior of the system can be adapted; providing a feasibility of implementing the strategy; and optimizing the strategy with respect to other performance strategies for running the system.

Preferably, the system state, workload, and performance parameters comprise parameters related to any of a switch, storage controller, and computer disks of the system. Additionally, the comparator is preferably adapted to retrieve a current system state and workload in the mapping and comparing a performance from the mapping with a current performance of the system to determine if the system comprises the performance abnormalities. Furthermore, the computer may further comprise a cache searcher adapted to search the mapping for the load characteristics that are closest to a current load being applied to the system; and a calculator adapted to determine a change in the load characteristics of monitored data in comparison to a last n number of snapshots when performance goals of the system are being met.

These and other aspects of embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

Figure 1:
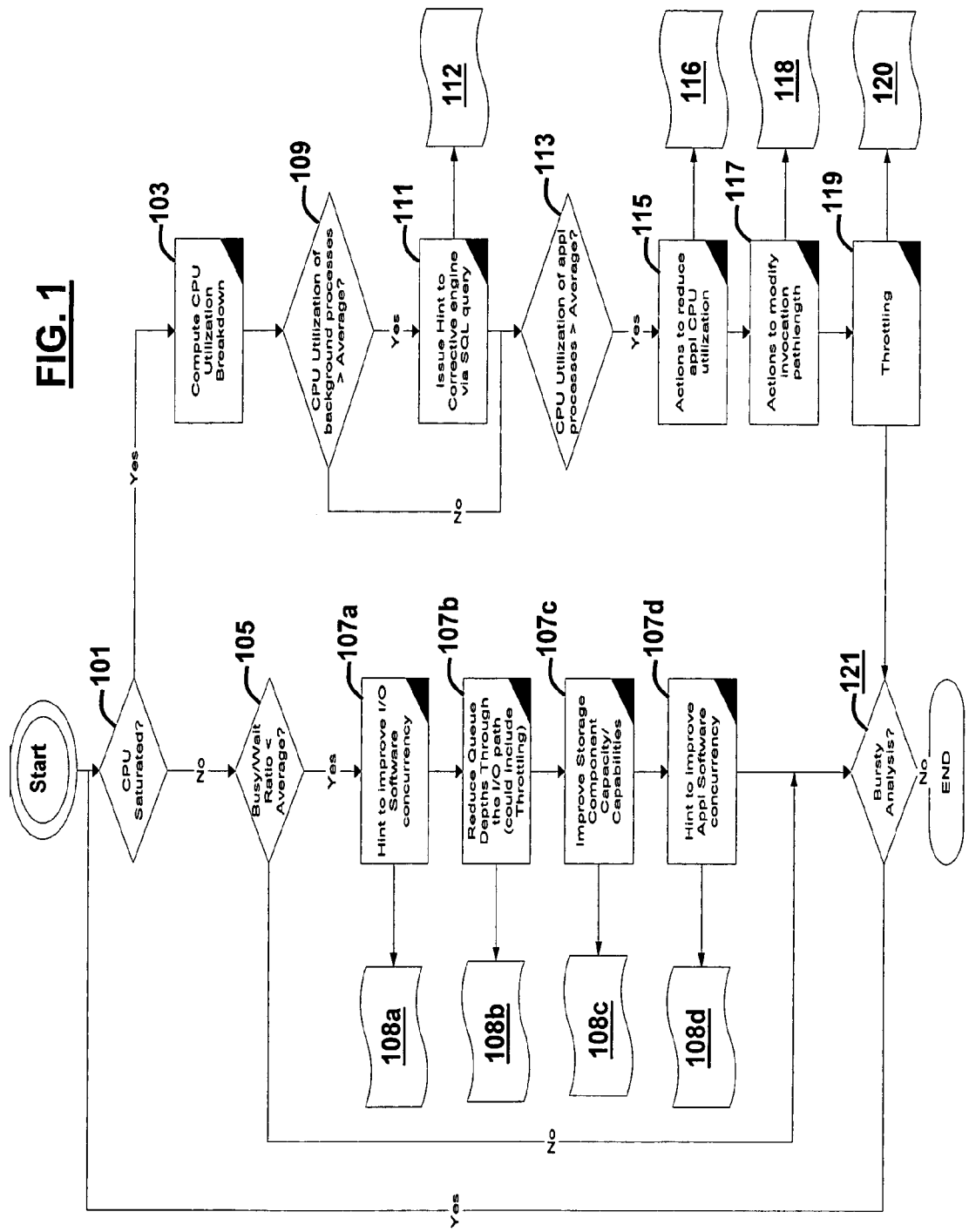
FIG. 1 illustrates a first flow diagram of a method according to an embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned, there remains a need for a simplistic problem determination framework in the domain of computer storage systems. The embodiments of the invention achieve this by providing a simplistic and well-defined technique for problem determination in storage systems. This technique is based on monitoring resource usage levels and a mapping of the system workload to performance of the system. Referring now to the drawings, and more particularly to FIGS. 1 through 5, there are shown preferred embodiments of the invention.

The embodiments of the invention provide (1) means for problem detection by using a workload to performance mapping technique; (2) a problem determination technique for storage systems with an automated "cook-book" to analyze the different aspects of system behavior and shortlist the possible reasons for goal violation; and (3) the interaction interface between the CAE and the PD. As previously mentioned, the conventional solutions provide an interface between the CAE and the PD that is event-based where the events signify the nature of the problem within the system. Conversely, the embodiments of the invention provide a query-style interface for the interaction of PD and CAE.

Specifically, the embodiments of the invention provide a query-style interaction interface between the PD and CAE. The embodiments of the invention are explicitly built for the storage virtualization layer and can be extended to other domains. The query-style interaction interface is generically applicable. Compared to an event-based approach, the query-style approach has the advantage of capturing the intuition and having a weak coupling between the PD and CAE. A query is a generic description of the goal violation, and hence the PD and CAE can be updated and built rather independently.

According to the embodiments of the invention, the operation of the software virtualization layer is divided into computation (referred to as CPU work), and fetching the data (referred to as I/O work). Both the CPU work and I/O work are dependent on each other and are characterized by attributes such as concurrency, wait-time, and processing-time (referred to as work-attributes). In the embodiments of the invention, the violation of goals is mapped to an imbalance of the CPU work and I/O work; i.e., an imbalance where the CPU work waiting for I/O work, or vice-versa or both. This imbalance could exist in the normal workload conditions or specifically during burstiness of the requests. The analysis of the embodiments of the invention is in terms of whether the imbalance is on the CPU work or the I/O work and the corresponding work-attributes that could be possibly improved by CAE; e.g. increase concurrency in the CPU work. The interaction with the CAE is in the form of the query (instead of the existing event-based paradigm) e.g. SELECT action WHERE imbalance=CPU AND work_attribute=Concurrency AND workload_details=current-value.

The embodiments of the invention analyze the monitored information of the system and determine abnormal behavior. The analysis takes into account: (1) system parameters are inter-dependent; i.e., values of system parameters cannot be considered in isolation; (2) there are multiple possible ways to output what the problem is and what devices are involved, which the CAE can use to decide how it can be corrected; e.g. decreasing service-time in I/O work or increasing concurrency in CPU work can both help in reducing the execution latency. The output of problem determination is not a definitive prescription of how the system should be adapted, but rather a collection of "strategies" that the CAE can analyze for feasibility and optimization.

The technique provided by the embodiments of the invention, which is referred to as a "BALANCEMODEL" is a simplistic model for analyzing information of a storage system. There are two axioms to analyze the monitored information:

Axiom 1: the violation of performance goals within a virtualization layer can be mapped to an imbalance between the CPU work and I/O work. The storage virtualization layer is said to be balanced if either the CPU is saturated OR the wait time for the I/O work is limited by the physical capabilities of the components OR both.

Axiom 2: Both the CPU work and I/O work are characterized by attributes of concurrency, wait-time, service-time, and other non-performance properties such as error-rate, security. The implications of ALL the actions present within the CAE can be expressed as one or more of the CPU or I/O work attributes; e.g. pre-fetching changes the wait-time in the CPU work, data-migration generally changes the service-time (by moving to faster disks) in the I/O work, etc.

Given the above axioms, the task of analyzing monitored information is reduced to determining the imbalance (CPU work or I/O work) and the corresponding work-attribute. In other words, a software system can include multiple software virtualization layers; e.g. the SAN.FS virtualization layer running on the iSCSI virtualization layer. The BALANCEMODEL is applied to each layer. The point to be noted is that the "knobs" or adaptive actions to change the work-attributes of one layer may be present in a higher layer. For example, the pre-fetch knob in not present in the iSCSI layer; rather it is part of the file-system or database running on the iSCSI layer.

The rest of the details are divided in the following steps: (1) parsing the monitored information for the values of the CPU and I/O work-attributes. The parameters to measure these attributes are specific to the protocol of the virtualization layer; e.g. in SAN.FS, the wait-time for the I/O work consists of parameters of the meta-data server and the data disks. (2) Comparing the work-attributes values with normal behavior. For example, if the average service-time of the disk is 15 msec, should that be considered the normal behavior of the disk or should it be interpreted as a saturation? Determining saturation is not straightforward (besides components such as CPU) and hence is based on a relative measure. (3) Query-style interaction between PD and CAE. The query expresses the strategy of how the system behavior can be adapted, while the CAE analyzes the feasibility of the strategy and optimizes with respect to the other strategies.

Figure 2:
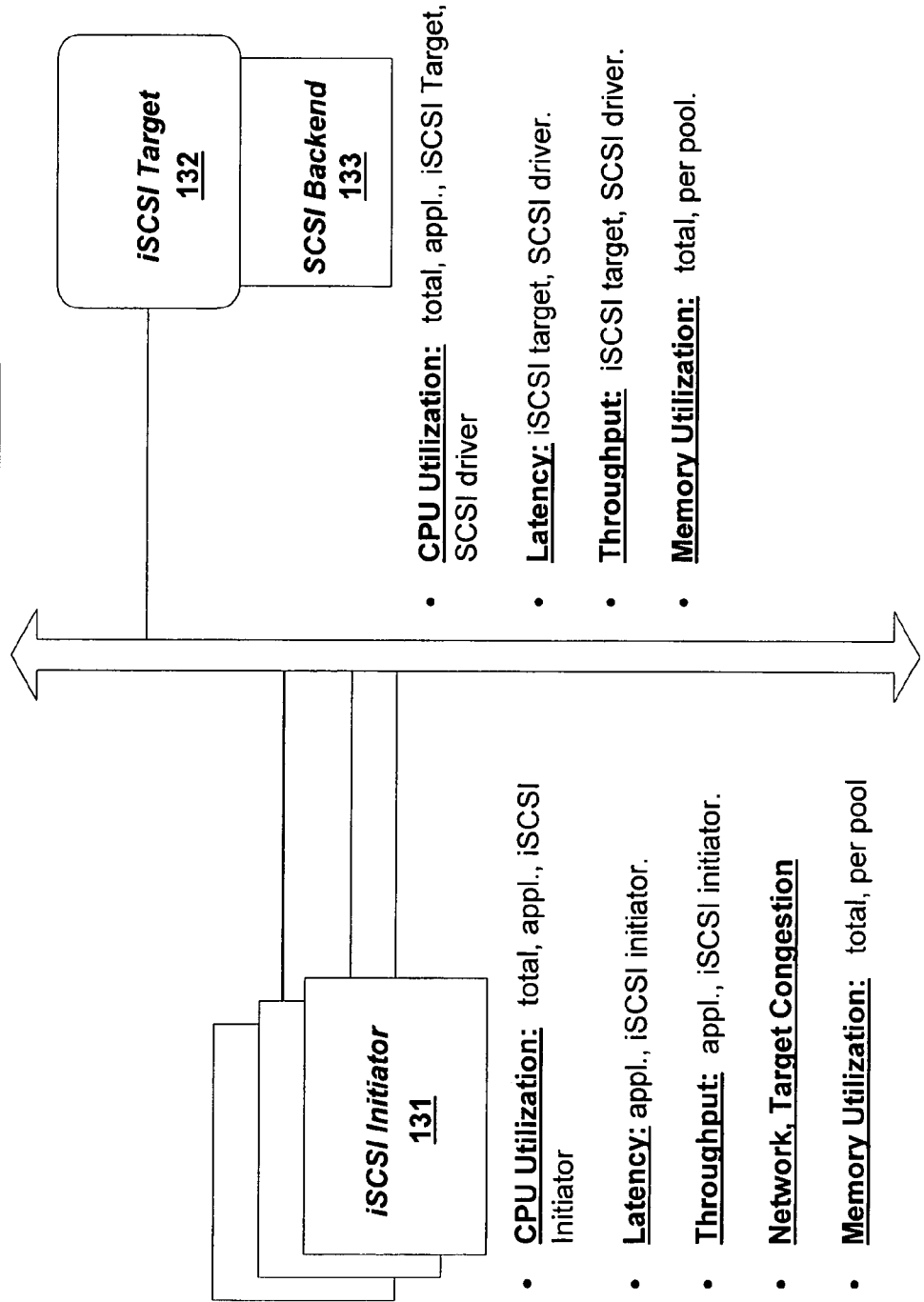
FIG. 2 illustrates a schematic diagram of an example of a multi-initiator, single-target iSCSI infrastructure according to an embodiment of the invention.

Taking the first step in more detail, parsing the monitored information for the values of CPU and I/O work-attributes. FIG. 1 shows how the sequence of how monitored information is analyzed. FIG. 2 illustrates an example of an implementation of an embodiment of the invention, whereby the BALANCEMODEL is applied to a multi-initiator iSCSI scenario. The flowchart in FIG. 1 has two branches for the CPU and I/O work respectively. The branches begin by measuring (101) the CPU saturation. If the CPU is saturated (Yes), then the process analyzes (103) the CPU work for per-process usage breakdown, process priorities, pathlength, and concurrency values. Conversely, if the CPU is not saturated (No), then I/O work attributes are compared with a history of normal behavior.

The parameters analyzed for the work-attributes are protocol specific; e.g. the I/O parameters in SAN.FS comprise metadata parameters such as TCP/IP network usage, metadata server utilization, and data parameters such as those of the switch, storage controller and disks. In other words, whenever the BALANCEMODEL is applied to a virtualization layer, the protocol specific parameters are defined for the CPU and I/O work-attributes. At the first level, the BALANCEMODEL determines whether the computation or I/O bandwidth is a bottleneck—this is accomplished by comparing (105) the current wait time with an historical average. Depending on which branch is selected, the BALANCEMODEL further breaks down (108a-108d) the problem between the individual modules along the respective paths (107a-107d); e.g., on the I/O branch, it can be the disks, the controller, the interconnect, or the metadata servers that have abnormal queue-length, wait-time, and/or processing time. Thereafter a burstiness analysis is performed (121) using well-known techniques.

Taking the second step in more detail, comparing the work-attributes values with a history of normal behavior, the BALANCEMODEL records a periodic snapshot (for example, every 120 seconds) of the monitored data. The monitored information is preferably a tuple of the form: <load characteristics, physical component behavior> where load characteristics={request-rate, read-write_ratio, request-size, sequential/random_ratio) behavior={wait-time, processing-time, throughput). In other words, normal performance is defined by some mapping of system state and workload to performance. In order to determine if there is an abnormality the current system state and workload are used to look up the normal performance under those conditions and the normal performance is compared to the current performance. In summary, the history records the behavior of the physical components as a function of the load characteristics.

Figure 5:
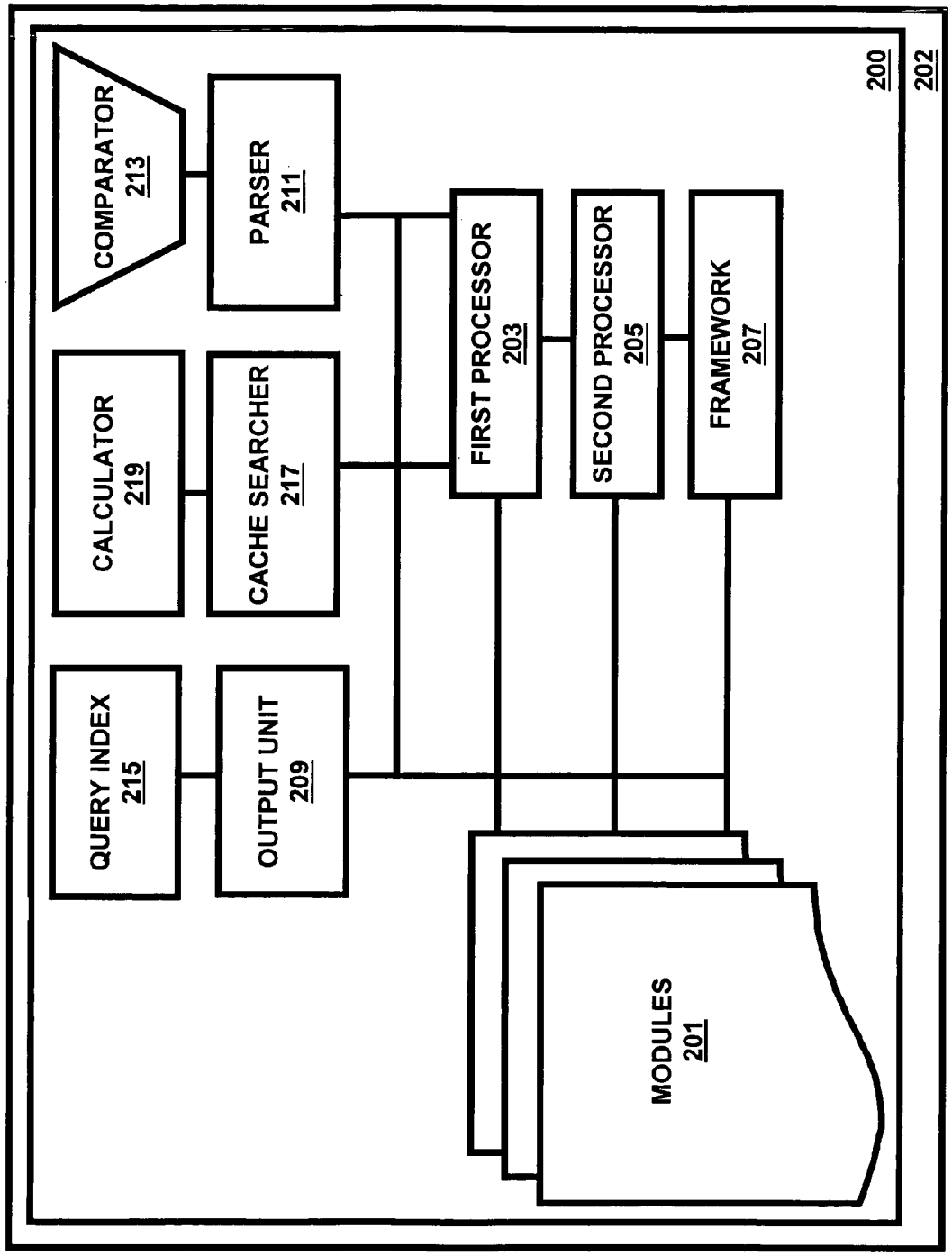
FIG. 5 is a schematic diagram of a computer according to an embodiment of the invention.

In the BALANCEMODEL, whenever the work-attributes need to be analyzed, a device, such as the calculator 219 shown in FIG. 5, determines the change in load characteristics in comparison to the last n snapshots when the goals were being met. If there are no significant changes in the load characteristics, then the previous snapshot values are used as history. Otherwise, the history is searched for the load characteristics that are "closest" to the current load. The notion of "closest" is defined by the weights assigned to each of the load parameters.

Taking the third step in more detail, the query-style interaction between PD and CAE, a generic template for the query is of the form:

---

QZ:
    SELECT action WHERE
    work = -- AND attribute = -- AND
    <component, current-behavior, normal-behavior> AND load=current.
    ALTERNATIVE <source-component, target components>
EXECUTE IF QY= false The specifics of the query template are explained in the context of an example as described below.

In one example of an embodiment of the invention, the BALANCEMODEL is applied to iSCSI. The following comprises a set of parameters which could be made tunable in storage systems in order to prototype an automatic problem-determination platform such as BALANCEMODEL. Some of the parameters are implicitly bound to higher layers in storage systems (i.e., file systems and database systems) while others can be associated with lower layers of the storage protocol stack (i.e., Block I/O). A specific value (i.e., high or low) of the variables described below has sonic positive and negative aspects for various load conditions. If such is not the case, it does not make sense to make the variable a tunable parameter.

High-level variables are generally controlled at higher levels (i.e., file systems, database management software). Generally, pre-fetching is performed at higher levels than the block I/O level although some systems may implement pre-fetching schemes at lower layers like block I/O. High Pre-fetching can provide significant improvements in performance for sequential read patterns. It makes sense to make pre-fetching a tunable parameter as such feature is desirable for sequential read patterns but it may hurt performance for random read patterns. In the case of random-reads, high values of pre-fetching may result in wasted I/O bandwidth. Generally, a de-staging interval is controlled at higher levels than the block I/O level. If it is controlled at the block-level it may be used to enhance performance of highly localized write patterns but yet it may affect reliability and our ability to recover from failures. Frequent de-staging of data to stable storage is convenient to ensure data integrity and desirable when write patterns are not highly localized. High rates of de-staging, however, may result in poor performance for highly localized write patterns.

Low-level variables are generally controlled at block I/O level in the storage stack of protocols. These variables apply directly to the iSCSI/SCSI framework and hence are referred to within this context. Generally, with respect to block aggregation size, OSs try to aggregate I/O requests issued by application in a single I/O operation as much as possible. For example, in Linux™, the maximum value of such aggregation is determined by the low-level driver via a parameter template that the driver provides to higher level SCSI drivers during installation. The maximum value of this parameter may also be limited by kernel constants and implicit limitations like the fact that a scatter-gather list for an I/O operation must fit in one physical memory page. A maximum block aggregation size is desirable for high throughput unless this size has a side effect to control when the I/O goes to the device, in which case this variable must be made tunable. One may want to reduce block aggregation when low latency is more important than high throughput.

With respect to the backend adapter target queue depth, the queuing capabilities at the target 131 can be changed dynamically to determine how many CPU cycles get dedicated to each target adapter. Generally, it is desirable to have queues as large as possible but yet in targets 131 that manage multiple backend adapters (not shown), it may be desirable to be able to control the adapter queue size dynamically. With such feature, a given adapter may be given higher priority than others. Large queue sizes in the backend 132 are desirable for high throughput and dealing with bursts of traffic, yet smaller queue sizes may be used to control CPU and resource distribution among several backends 132.

With respect to the target flow control window, the maximum value of the flow control window for each initiator 130 can be used to throttle network resources consumed by each initiator 130. It is desirable to be able to dynamically control the flow of commands generated by each initiator 130 to match user-imposed policies. Large flow control windows generally result in higher throughput, yet smaller flow control windows may be used to throttle traffic from each initiator 130.

With respect to the network path, it may be desirable to dynamically switch network paths used between an initiator 130 and target 131 to bypass congested routes. The iSCSI protocol supports multiple TCP connections per session which may be used towards this goal. With respect to memory resources, iSCSI targets 131 and initiators 130 are generally run inside the kernel and the various memory pools employed by it may be statically restricted in size limiting performance. Making the size of these memory pools dynamic may enable a diagnostic and correction engine to better allocate resources and performance across the system. As an example burst applications may benefit from larger memory pools during periods of high traffic. Dedicating large amounts of memory to each pool is desirable as it enables one to deal with bursts of traffic yet memory is generally limited, especially when the software module is located in the kernel, and keeping pools to a minimum is also desirable.

With respect to CPU Concurrency Control, iSCSI targets 131 and initiators 130 are multithreaded, generally employing one thread per session. Such granularity may work best for some number of sessions a granularity of requests but it may not be optimal for some other configurations and traffic patterns. For example, in a system with a large number of tiny I/O requests and a single session it may be desirable to have multiple threads working on the same session. Dynamically controlling this may be a significant effort as it may involve re-architecting current software to dynamically change the number of threads employed at a given time and tune the thread allocation to various tasks. In a scenario where there are various sessions, each with similar traffic patterns a thread per session may he the best choice for concurrency. For a very large number of sessions a thread per session may be undesirable as it may cause too much overhead at the OS level and then a thread per a given number of sessions may be desirable.

The following includes parameters that have been identified as of interest for a problem determination platform in the context of iSCSI. Using the current values of these parameters and administrative policies, a set of corrective actions can be selected to act on the list of previously described tunable variables. These parameters are useful in characterizing current system behavior and comparing it with normal behavior. Workload parameters include those parameters that are input into the system, and performance parameters include those parameters that are output from the system. Some of these parameters help characterize the current load imposed in the system provided by an embodiment of the invention.

First, in iSCSI System Behavior Monitoring, with respect to throughput, of interest is the read/write throughput at the session level (i.e., between an initiator 130 and a target 131), at the VLUN level (i.e., Virtual LUN), and throughput of one initiator 130 with respect to others. With respect to the CPU utilization at initiator 130 and target 131, the CPU utilization can be used to gauge when concurrency increases may be necessary. As an example, a session throughput goal being violated under low CPU utilization at the target 131 and initiator 130 may indicate that an increase of concurrency at the initiator 130 or target 131 may bring the system to a compliant state with its throughput goals. It is desirable to devise ways to measure CPU utilization in multiple CPU systems which yield the right perspective. As an example of issues that should be avoided: a low-concurrency initiator 130 in a multiprocessor may render one processor busy while others are idle. This scenario must be dealt with concurrency increases. When multiple pieces of the system are sharing the same system, it is useful to get CPU utilization derived from each part of the system. As an example, an iSCSI target 131 may be at full CPU utilization caused by the low-level SCSI driver that handles the backend for the target 131 and increases in the concurrency level of the iSCSI target 131 itself may only worsen the situation.

With respect to request latency at the target 131 and target backends 132, the latencies at the target 131 are needed to make sense of increasing latencies at the initiator 130. By measuring the two parameters we can detect when latency increases can be attributed to network congestion or resource capabilities at the target backend 132. Long latencies at the target backend 132 could be addressed by reducing I/O size or reducing concurrency at the target 131 (i.e. when too many sessions are involved).

With respect to the request latency at the initiator 130, increases in latencies at the initiator 130 can be attributed to network congestion, CPU saturation at the target 131, or backend resource saturation. In combination with these other parameters the system may take appropriate corrective actions. As an example, when latency can be attributed to network congestion, alternative paths may be selected; when CPU saturation at the target 131 is the cause of increased latency, reallocation of resources between various initiators 130 may be called for.

With respect to network congestion, network congestion signals should be instrumented at the TCP connection level and the interface level. When a given TCP connection or interface shows signs of congestion, alternate network paths may be selected to the iSCSI target 131 in order to improve compliance of a system with a given set of goals. Network congestion at the level of the interface (i.e., the interface not being able to handle the packet rate generated by a given CPU) can be easily detected by monitoring interface statistics about packet loss. Network congestion at the router level is harder to detect when using TCP/IP as network congestion events are kept hidden from the application. (i.e., as an example, lost and retransmitted packets, which is the TCP congestion signal, is kept hidden from the application using the TCP connection). Application observed latency could be used as a measure of network congestion, especially when request latency at the target 131 is also being monitored. With respect to memory utilization, it helps one determine the utilization of a given memory pool. Such information can be utilized to determine memory bottleneck in the system, especially when studying system behavior under peak utilization or saturation.

Second, in workload characterization, with respect to I/O sizes, the I/O size of each request is an important parameter as it may influence latency and throughput. With respect to the sequential to random ratio, this information is generally useful when controlling high-level variables such as pre-fetching and de-stage frequency. With respect to the arrival rate, this parameter may be used to trigger throttling actions on given parts of the system. As an example, if the arrival rate at an iSCSI target 131 is too high, initiators 130 may be throttled to send fewer requests. With respect to read/write rates, read/write rates may significantly affect the current behavior of the system. For example, a system may exhibit 60 MB/seconds of raw reads but such throughput may be tuned down to 30 MB/seconds in the presence of a concurrent write flow of 20 MB/seconds.

Again, in another example of an implementation of an embodiment of the invention, the BALANCEMODEL is applied to a multi-initiator iSCSI scenario. For example, FIG. 2 illustrates such a scenario of a multi-initiator, single-target iSCSI infrastructure, which is assumed to be instrumented with the variables and parameters previously described above.

Again, with respect to FIG. 1, for the first scenario, it is assumed that the average CPU utilization at initiator 130 is over the agreed goal. At this point the problem detection methodology is activated and the CPU load attributable to the initiator code and background processes in this node is computed (109). If the violation on the average CPU utilization is due to background processes, a hint is passed (111) to the corrective engine about this fact via a SQL query indicating such condition. In this case, the corrective engine may act (112) reducing the CPU availability to background processes perhaps by lowering their priority, or stopping or eliminating them. If the violation in average CPU utilization can be traced to CPU utilization due to the iSCSI initiator application 130 (of FIG. 2), then a hint about such an event is passed to the corrective engine for proper corrective actions.

Examples of corrective actions (115) in this case may involve reducing concurrency at the initiator software 130 or increasing block aggregation if traffic is significantly sequential (116). In some situations the corrective engine should know details of the state of the system so it can select the most appropriate corrective action. In this case, for example, the corrective engine should know whether the I/O patterns are random or sequential. One can use a push or pull model to provide this information to the corrective engine.

In the push model, queries about a given undesirable state of the system are accompanied by the relevant state of the system. In the pull model, the corrective engine is allowed to query the state of the system directly. Following up in the original example, the problem determination engine can further suggest to the corrective engine to determine whether actions are available to modify (117) the length of our invocation path. In this case, a way to achieve this would be offloading iSCSI and/or TCP processing to a network adapter supporting such offloading (118). Finally, application throttling (119) may be suggested as a way to reduce (120) CPU utilization derived from the iSCSI initiator 130 (of FIG. 2). Moreover, the corrective engine may receive a set of suggestions and act on all of them at once. Preferably, the corrective engine and the problem determination interface is a loose coupling rather than a tight synchronous one.

In a second scenario, it is assumed that the CPU busy/wait ratio is below average (i.e., large latencies or low throughput). In this case, the problem determination engine suggests time concurrency of the iSCSI initiator software 130 to be increased or the concurrency of the applications to be increased. Other actions that could improve the CPU busy/wait ratio for this scenario could be the queue depth at the storage device or iSCSI target 131 (by throttling other clients, one can improve delays for the client in question in this case). If storage behind the iSCSI is virtualized, one could even suggest migration of virtual LUNs to disks with better performance or perhaps filtering down QoS requirements to such a system.

Concurrently, as the problem determination scans the system for violations of average goals, the system is also scanned for bottlenecks and saturation points. Generally, the same flow process is run against the system but goals are set to saturation or peak values rather than average numbers. When saturation points or peak numbers are reached at any stage of the system, hints are passed to the corrective engine which in this case takes actions to deal with the peaks and saturation. It is desirable to pass explicitly information to the corrective engine about these being violations of peak or saturation values and not average violations as corrective actions may be different in each case.

As an example, assume time scenarios where the busy/wait ratio at one initiator 130 hits its lowest level frequently during a monitoring interval yet the CPU is underutilized. The same set of actions suggested above can be issued to the corrective engine but yet the hint about this being a peak or saturation point needs to be provided to the corrective engine. This hint may serve the corrective engine to pursue more fine grained monitoring of the system (memory pools or queue utilization at various levels) and more drastic actions such as, for example, increasing the queue size or memory pool sizes at saturated points in the I/O path. As an example, one could increase the queue size at the iSCSI target 131 or the low level SCSI driver 132 at the target 131.

Another example is to consider the interactions derived from an iSCSI target 131 that reaches CPU utilization close to the maximum goal. Actions that could mitigate this situation could include reducing concurrency at the target 131, offloading TCP and iSCSI target functionality to a network adapter (not shown), or throttling down active initiators 130.

Figure 3:
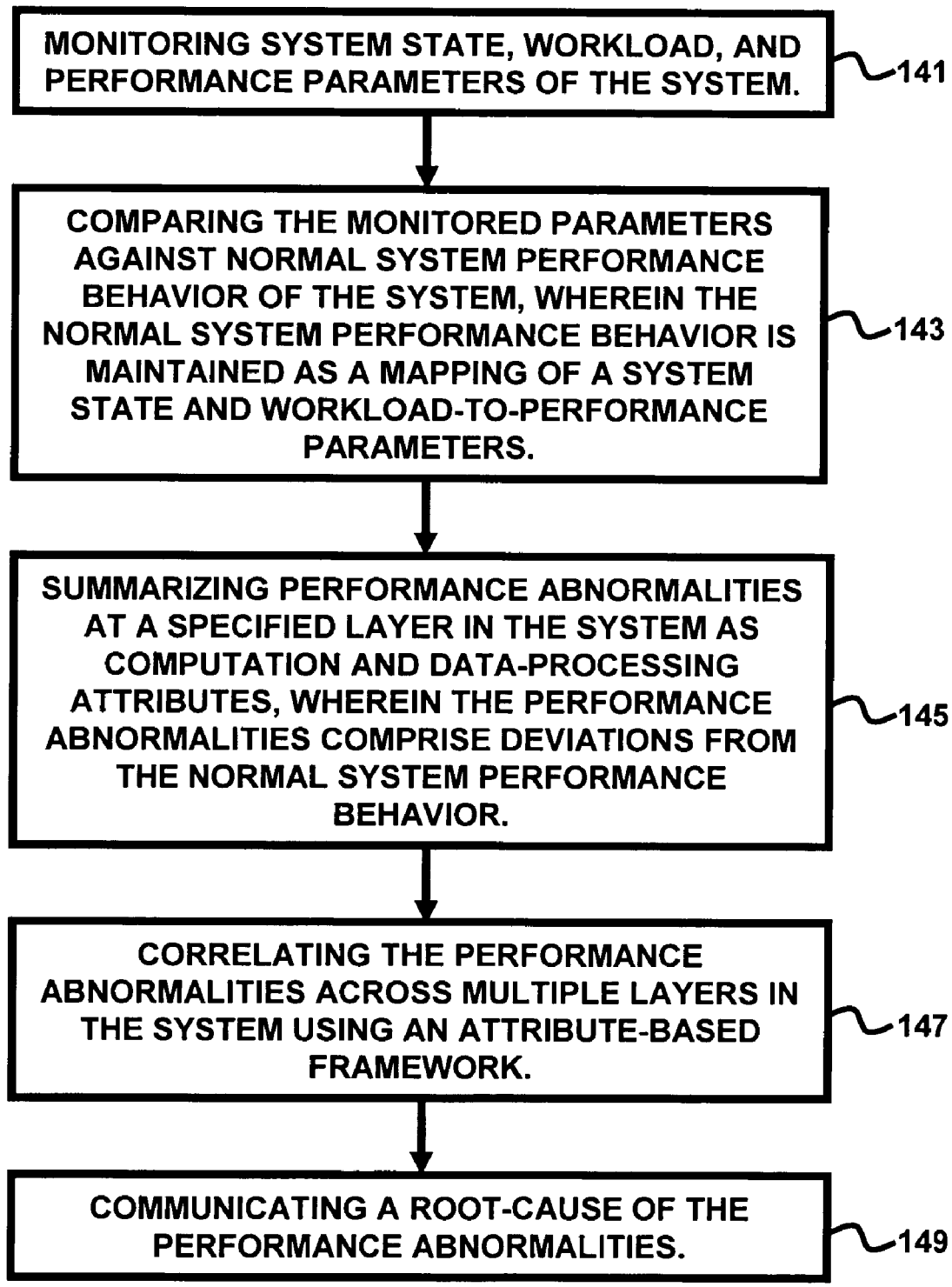
FIG. 3 illustrates a second flow diagram of a method according to an embodiment of the invention.

FIG. 3 illustrates a flow diagram of a method for problem detection and determination for automated system management in a system, wherein the method comprises monitoring (141) system state, workload, and performance parameters of the system; comparing (143) the monitored parameters against normal system performance behavior of the system, wherein the normal system performance behavior is maintained as a mapping of a system state and workload-to-performance parameters; summarizing (145) performance abnormalities at a specified layer in the system as computation and data-processing attributes, wherein the performance abnormalities comprise deviations from the normal system performance behavior; correlating (147) the performance abnormalities across multiple layers in the system using an attribute-based framework; and communicating (149) a root-cause of the performance abnormalities.

Preferably, the monitoring (141) of the system state, workload, and performance parameters comprises parsing the monitored data for values associated with computer processing unit (CPU) and input/output (I/O) work attributes, and wherein the system state, workload, and performance parameters are specific to a protocol of the specified layer in the system. Furthermore, the summarizing (145) of performance abnormalities at a specified layer in the system as computation and data-processing attributes preferably comprises comparing computer processing unit (CPU) and input/output (I/O) work attributes with the mapping of the normal performance behavior of the system. The method may further comprise communicating the root-cause of the performance abnormalities in a query format by expressing a strategy of how an optimal performance behavior of the system can be adapted; providing a feasibility of implementing the strategy; and optimizing the strategy with respect to other performance strategies for running the system. Additionally, the monitoring (141) of system state, workload, and performance parameters comprises measuring parameters related to any of a switch, storage controller, and computer disks of the system.

Moreover, the comparing of CPU and I/O work attributes with the history of the normal performance behavior of the system may comprise retrieving a current system state and workload in the mapping and comparing a performance from the mapping with a current performance of the system to determine if the system comprises the performance abnormalities. The method may further comprise analyzing the CPU and I/O work attributes using any of searching the mapping for the load characteristics that are closest to a current load being applied to the system; and determining a change in the load characteristics of monitored data in comparison to a last n number of snapshots when performance goals of the system are being met.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
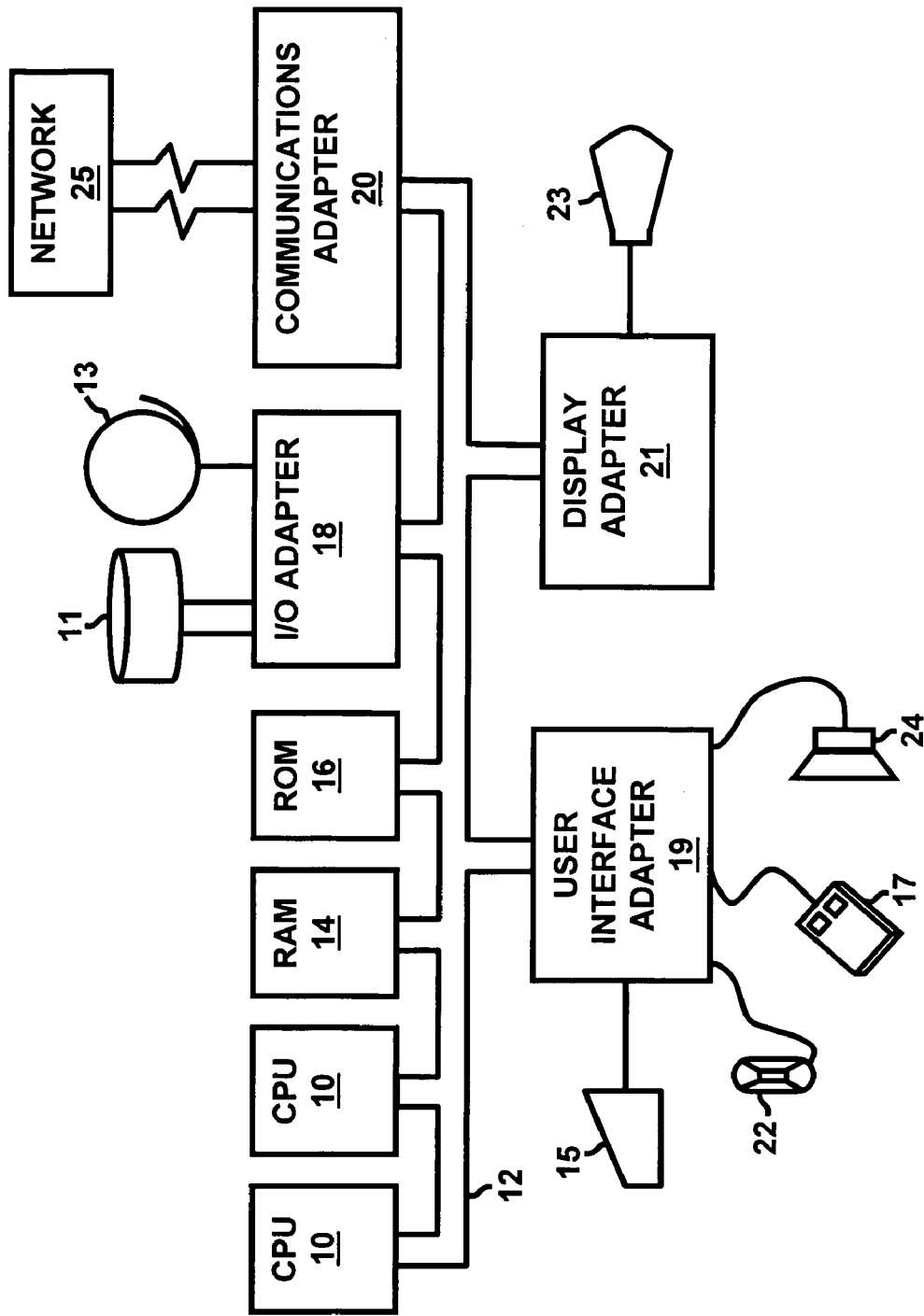
FIG. 4 is a computer system diagram according to an embodiment of the invention.

A representative hardware environment for practicing the embodiments of the invention is depicted in FIG. 4. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

FIG. 5 illustrates a computer 200 for problem detection and determination for automated system management in a system 202 according to an embodiment of the invention, wherein the computer 200 comprises modules 201 comprising system state, workload, and performance parameters of the system 202 capable of being monitored; a first processor element 203 adapted to compare the monitored parameters against normal system performance behavior of the system 202, wherein the normal system performance behavior is maintained as a mapping of a system state and workload-to-performance parameters; a second processor element 205 adapted to summarize performance abnormalities at a specified layer in the system 202 as computation and data-processing attributes, wherein the performance abnormalities comprise deviations from the normal system performance behavior; an attribute-based framework 207 adapted to correlate the performance abnormalities across multiple layers in the system 202; and an output unit 209 adapted to communicate a root-cause of the performance abnormalities.

The computer 200 may further comprise a parser 211 adapted to parse the monitored data for values associated with computer processing unit (CPU) and input/output (I/O) work attributes, and wherein the system state, workload, and performance parameters are specific to a protocol of the specified layer in the system 202. Additionally, the computer 200 may further comprise a comparator 213 adapted to compare computer processing unit (CPU) and input/output (I/O) work attributes with the mapping of the normal performance behavior of the system 202. Also, the computer 200 may further comprise a query index 215 adapted to communicate the root-cause of the performance by expressing a strategy of how an optimal performance behavior of the system 202 can be adapted; providing a feasibility of implementing the strategy; and optimizing the strategy with respect to other performance strategies for running the system 202. Preferably, the system state, workload, and performance parameters comprise parameters related to any of a switch, storage controller, and computer disks of the system 202.

Additionally, the comparator 213 is preferably adapted to retrieve a current system state and workload in the mapping and comparing a performance from the mapping with a current performance of the system 202 to determine if the system 202 comprises the performance abnormalities. Furthermore, the computer 200 may further comprise a cache searcher 217 adapted to search the mapping for the load characteristics that are closest to a current load being applied to the system 202; and a calculator 219 adapted to determine a change in the load characteristics of monitored data in comparison to a last n number of snapshots when performance goals of the system 202 are being met.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention has been described in terms of preferred embodiments, those skilled in the art will recognize that the embodiments of the invention can be practiced with modification within the spirit and scope of the appended claims.

What is claimed is:

1. A machine-implemented method for problem detection and determination for automated system management in a system, said method comprising:
    monitoring, by a computing device, system state, workload, and performance parameters of said system;
    comparing, by a computing device, the monitored parameters against normal system performance behavior of said system, wherein said normal system performance behavior is maintained as a mapping of a behavior of physical components as a function of load characteristics;
    summarizing performance abnormalities, by a computing device, at a specified layer in said system as computer processing unit (CPU) and input/output (I/O) attributes, wherein said performance abnormalities comprise deviations from said normal system performance behavior;
    correlating said performance abnormalities, by a computing device, across multiple layers in said system using a query-style interaction interface; and
    communicating, by a computing device, a root-cause of said performance abnormalities based on a query index expressing a strategy of how an optimal performance behavior of said system can be adapted.

2. The method of claim 1, wherein said monitoring said system state, workload, and performance parameters comprises parsing said monitored data for values associated with said computer processing unit (CPU) and said input/output (I/O) work attributes, and wherein said system state, workload, and performance parameters are specific to a protocol of said specified layer in said system.

3. The method of claim 1, wherein said summarizing of performance abnormalities at a specified layer in said system as computer processing unit (CPU) and input/output (I/O) attributes comprises comparing said computer processing unit (CPU) and input/output (I/O) work attributes with said mapping of said normal performance behavior of said system.

4. The method of claim 1, further comprising:
    communicating, by a computing device, said root-cause of said performance abnormalities in a query format by:
    providing, by a computing device, a feasibility of implementing said strategy; and
    optimizing, by a computing device, said strategy with respect to other performance strategies for running said system.

5. The method of claim 1, wherein said monitoring system state, workload, and performance parameters comprises measuring parameters related to any of a switch, storage controller, and computer disks of said system.

6. The method of claim 3, wherein said comparing CPU and I/O work attributes with a history of said normal performance behavior of said system comprises retrieving a current system state and workload in said mapping and comparing a performance from said mapping with a current performance of said system to determine if said system comprises said performance abnormalities.

7. The method of claim 6, further comprising analyzing said CPU and I/O work attributes using at least one of:
    searching, by a computing device, said mapping for said load characteristics that are closest to a current load being applied to said system; and determining, by a computing device, a change in said load characteristics of monitored data in comparison to a last n number of snapshots when performance goals of said system are being met.

8. A computer for problem detection and determination for automated system management in a system, said computer comprising:
- modules comprising system state, workload, and performance parameters of said system capable of being monitored;
- a first processor element adapted to compare the monitored parameters against normal system performance behavior of said system, wherein said normal system performance behavior is maintained as a mapping of a behavior of physical components as a function of load characteristics;
- a second processor element adapted to summarize performance abnormalities at a specified layer in said system as computer processing unit (CPU) and input/output (I/O) attributes, wherein said performance abnormalities comprise deviations from said normal system performance behavior;
- a query-style interaction interface adapted to correlate said performance abnormalities across multiple layers in said system; and
- an output unit adapted to communicate a root-cause of said performance abnormalities based on a query index expressing a strategy of how an optimal performance behavior of said system may be adapted.

9. The computer of claim 8, further comprising:
- a parser adapted to parse said monitored data for values associated with computer processing unit (CPU) and input/output (I/O) work attributes, and wherein said behavior of physical components as a function of load characteristics are specific to a protocol of said specified layer in said system.

10. The computer of claim 8, further comprising:
- a comparator adapted to compare computer processing unit (CPU) and input/output (I/O) attributes with said mapping of said normal performance behavior of said system.

11. The computer of claim 8, further comprising: said query index adapted to communicate said root-cause of said performance by:
- providing a feasibility of implementing said strategy; and
- optimizing said strategy with respect to other performance strategies for running said system.

12. The computer of claim 8, wherein said system state, workload, and performance parameters comprise parameters related to any of a switch, storage controller, and computer disks of said system.

13. The computer of claim 10, wherein said comparator is adapted to retrieve a current system state and workload in said mapping and comparing a performance from said mapping with a current performance of said system to determine if said system comprises said performance abnormalities.

14. The computer of claim 13, further comprising:
- a cache searcher adapted to search said mapping for said load characteristics that are closest to a current load being applied to said system; and
- a calculator adapted to determine a change in said load characteristics of monitored data in comparison to a last n number of snapshots when performance goals of said system are being met.

15. A program storage device readable by computer, tangibly embodying a program of instructions executable by said computer to perform a method for problem detection and determination for automated system management in a system, said method comprising:
- monitoring system state, workload, and performance parameters of said system;
- comparing the monitored parameters against normal system performance behavior of said system, wherein said normal system performance behavior is maintained as a mapping of a behavior of physical components as a function of load characteristics;
- summarizing performance abnormalities at a specified layer in said system as computer processing unit (CPU) and input/output (I/O) attributes, wherein said performance abnormalities comprise deviations from said normal system performance behavior;
- correlating said performance abnormalities across multiple layers in said system using a query-style interaction interface; and
- communicating a root-cause of said performance abnormalities based on a query index expressing a strategy of how an optimal performance behavior of said system can be adapted.

16. The program storage device of claim 15, wherein said monitoring of said system state, workload, and performance parameters comprises parsing said monitored data for values associated with said computer processing unit (CPU) and said input/output (I/O) work attributes, and wherein said system state, workload, and performance parameters are specific to a protocol of said specified layer in said system.

17. The program storage device of claim 15, wherein said summarizing of performance abnormalities at a specified layer in said system as computation and data-processing attributes comprises comparing said computer processing unit (CPU) and said input/output (I/O) work attributes with said mapping of said normal performance behavior of said system.

18. The program storage device of claim 15, wherein said method further comprises:
- communicating said root-cause of said performance abnormalities in a query format by:
  - providing a feasibility of implementing said strategy; and
  - optimizing said strategy with respect to other performance strategies for running said system.

19. The program storage device of claim 15, wherein said monitoring system state, workload, and performance parameters comprises measuring parameters related to any of a switch, storage controller, and computer disks of said system.

20. The program storage device of claim 17, wherein said comparing CPU and I/O work attributes with a history of said normal performance behavior of said system comprises retrieving a current system state and workload in said mapping and comparing a performance from said mapping with a current performance of said system to determine if said system comprises said performance abnormalities.

21. The program storage device of claim 20, wherein said method further comprises analyzing said CPU and I/O work attributes using at least one of:
- searching said mapping for said load characteristics that are closest to a current load being applied to said system; and
- determining a change in said load characteristics of monitored data in comparison to a last n number of snapshots when performance goals of said system are being met.

* * * * *